(12) United States Patent
Shah et al.

(10) Patent No.: US 8,582,647 B2
(45) Date of Patent: Nov. 12, 2013

(54) METHODS AND SYSTEMS FOR QUALITY CONTROLLED ENCODING

(75) Inventors: Devarshi Shah, San Diego, CA (US); Phanikumar Bhamidipati, San Diego, CA (US); Vinod Kaushik, San Diego, CA (US); Serafim S. Loukas, Jr., Carlsbad, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1696 days.

(21) Appl. No.: 11/739,075

(22) Filed: Apr. 23, 2007

(65) Prior Publication Data
US 2008/0260042 A1    Oct. 23, 2008

(51) Int. Cl.
*H04N 11/04* (2006.01)

(52) U.S. Cl.
USPC .................................................. 375/240.05

(58) Field of Classification Search
USPC .................................................. 375/240.03
See application file for complete search history.

(56) References Cited

U.S. PATENT DOCUMENTS

| | | | | |
|---|---|---|---|---|
| 5,684,714 | A * | 11/1997 | Yogeshwar et al. | 370/521 |
| 6,895,410 | B2 | 5/2005 | Ridge | |
| 2001/0017887 | A1 | 8/2001 | Furukawa et al. | |
| 2004/0028139 | A1* | 2/2004 | Zaccarin et al. | 375/240.24 |
| 2004/0114817 | A1 | 6/2004 | Jayant et al. | |
| 2006/0222078 | A1 | 10/2006 | Raveendran | |
| 2007/0071092 | A1 | 3/2007 | Chin | |
| 2007/0201388 | A1 | 8/2007 | Shah et al. | |
| 2007/0274340 | A1 | 11/2007 | Raveendran et al. | |
| 2008/0123749 | A1* | 5/2008 | Bretillon et al. | 375/240.22 |
| 2009/0168884 | A1* | 7/2009 | Lu et al. | 375/240.16 |
| 2010/0091839 | A1* | 4/2010 | Wu et al. | 375/240.02 |

FOREIGN PATENT DOCUMENTS

| | | |
|---|---|---|
| EP | 1168731 | 1/2002 |
| JP | 2001245303 A | 9/2001 |
| WO | 9532565 | 11/1995 |
| WO | 2004077835 | 9/2004 |
| WO | 2006064098 | 6/2006 |
| WO | 2006099082 | 9/2006 |
| WO | 2007038701 A1 | 4/2007 |
| WO | 2007038702 | 4/2007 |

OTHER PUBLICATIONS

International Search Report—PCT/US07/067346—International Search Authority, European Patent Office—Sep. 25, 2008.
Written Opinion—PCT/US07/067346—International Search Authority, European Patent Office—Sep. 25, 2008.
Michal Ries, et al., "Content Based Video Quality Estimation for H.264/AVC Video Streaming," Wireless Communications and Networking Conference, 2007. IEEE, Mar. 1, 2007, pp. 2668-2673.

* cited by examiner

*Primary Examiner* — Shaun Gregory
(74) *Attorney, Agent, or Firm* — Elaine H. Lo

(57) ABSTRACT

This disclosure describes techniques for controlling a perceived quality of multimedia sequences to try to achieve a desired constant perceptual quality regardless of the content of the sequences. In particular, an encoding device may implement quality control techniques to associate a sequence segment with a content "class" based on the content of the segment, determine a perceptual quality metric of the sequence segment, and adjust at least one encoding parameter used to encode the segment is encoded such that for the perceptual quality of the sequence segment converges to the desired quality.

64 Claims, 6 Drawing Sheets

METHODS AND SYSTEMS FOR QUALITY CONTROLLED ENCODING

TECHNICAL FIELD

The disclosure relates to multimedia encoding and decoding and, more particularly, controlling the quality of encoded multimedia sequences.

BACKGROUND

Digital video (and more generally any multimedia sequence, i.e., audio, video, and pictures, or other lossy compression data) capabilities can be incorporated into a wide range of devices, including digital televisions, digital direct broadcast systems, wireless communication devices, personal digital assistants (PDAs), laptop computers, desktop computers, video game consoles, digital cameras, digital recording devices, cellular or satellite radio telephones, and the like. Digital video devices can provide significant improvements over conventional analog video systems in processing and transmitting video sequences.

Different video encoding standards have been established for encoding digital video sequences. The Moving Picture Experts Group (MPEG), for example, has developed a number of standards including MPEG-1, MPEG-2 and MPEG-4. Other examples include the International Telecommunication Union (ITU)-T H.263 standard, and the ITU-T H.264 standard and its counterpart, ISO/IEC MPEG-4, Part 10, i.e., Advanced Video Coding (AVC). These video encoding standards support improved transmission efficiency of video sequences by encoding data in a compressed manner.

Many current techniques make use of block-based coding. In block-based coding, frames of a multimedia sequence are divided into discrete blocks of pixels, and the blocks of pixels are coded based on the differences with other blocks. Some blocks of pixels, often referred to as "macroblocks," comprise a grouping of sub-blocks of pixels. As an example, a 16×16 macroblock may comprise four 8×8 sub-blocks. The sub-blocks may be encoded separately. For example, the H.264 standard permits encoding of blocks with a variety of different sizes, e.g., 16×16, 16×8, 8×16, 8×8, 4×4, 8×4, and 4×8. Further, by extension, sub-blocks of any size may be included within a macroblock, e.g., 2×16, 16×2, 2×2, 4×16, 8×2 and so on.

SUMMARY

This disclosure describes encoding techniques for controlling quality of encoded sequences of data. Generally, certain aspects of certain embodiments of the disclosure can be applied to any multimedia stream (i.e., audio, video, pictures, or any data using lossy compression). However, for brevity and without limitation, the certain embodiments of the disclosure are described and illustrated using video, multimedia data.

In certain aspects, a method for processing a sequence of digital video data comprises one or a combination of: encoding a segment of data associated with the digital video data using a set of encoding parameters; analyzing one or more properties of the encoded segment of data to associate the segment of data with one of a plurality of content classes; adjusting at least one of the encoding parameters used to encode the segment of data based at least on a perceived quality metric of the encoded segment of data and a target quality metric, which corresponds to the associated content class; and re-encoding the segment of data using the adjusted encoding parameters.

In certain aspects, an apparatus for processing digital video data comprises one or a combination of: an encoding module that encodes a segment of data associated with the digital video data using a set of encoding parameters; a content classification module that analyzes one or more parameters of the encoded segment of data to associate the segment of data with one of a plurality of content classes; and a quality control module that adjusts at least one of the encoding parameters used to encode the segment of data based at least on a perceived quality metric of the encoded segment of data and a target quality metric, which corresponds to the associated content class, wherein the encoding module re-encodes the segment of data using the adjusted encoding parameter.

In certain aspects, an apparatus for processing digital video data comprises one or a combination of: means for encoding a segment of data associated with the digital video data using a set of encoding parameters; means for analyzing one or more properties of the encoded segment of data to associate the segment of data with one of a plurality of content classes; means for adjusting at least one of the encoding parameters used to encode the segment of data based at least on a perceived quality metric of the encoded segment of data and a target quality metric, which corresponds to the associated content class; and means for re-encoding the segment of data using the adjusted encoding parameter.

In certain aspects, a machine readable medium having instructions stored thereon, the stored instructions including one or more segments of code, and being executable on one or more machines, the one or more segments of code comprises one or a combination of code for encoding a segment of data associated with the digital video data using a set of encoding parameters; code for analyzing one or more properties of the encoded segment of data to associate the segment of data with one of a plurality of content classes; code for adjusting at least one of the encoding parameters used to encode the segment of data based at least on a perceived quality metric of the encoded segment of data and a target quality metric, which corresponds to the associated content class; and code for re-encoding the segment of data using the adjusted encoding parameter.

In certain aspects, a method for processing multimedia data comprises one or a combination of: computing a perceived quality metric for an encoded segment of data associated with digital video data; and selecting one of a plurality of content classes based on the perceived quality metric and one of at least one encoding parameter used to encode the segment of data and a resultant bitrate of the encoded segment of data, wherein separating the blocks of pixels into groups based on at least one difference metric can include one or a combination of: separating possible difference metrics into groups, wherein at least a portion of the groups include two or more difference metrics; pre-computing quality metrics associated with each of the groups, wherein the quality metrics for the groups is equal to an average of quality metrics corresponding to each of the difference metrics associated with the groups; and pre-computing weights for each of the groups, wherein the weights for each of the groups are computed based on at least a portion of the difference metrics associated with the bins.

In certain aspects, an apparatus for processing multimedia data comprises one or a combination of: a quality measurement module that computes a perceived quality metric for an encoded segment of data associated with digital video data; and a class selection module that selects one of a plurality of content classes based on the perceived quality metric and one of at least one encoding parameter used to encode the segment of data and a resultant bitrate of the encoded segment of data, wherein the quality measurement module further performs one or a combination of: separates possible difference metrics into groups, wherein at least a portion of the groups include two or more difference metrics; pre-computes quality metrics associated with each of the groups, wherein the quality metrics for the groups is equal to an average of quality metrics corresponding to each of the difference metrics associated with the groups; and pre-computes weights for each of the groups, wherein the weights for each of the groups are computed based on at least a portion of the difference metrics associated with the bins.

In certain aspects, an apparatus for processing multimedia data comprises one or a combination of: means for computing a perceived quality metric for an encoded segment of data associated with digital video data; and means for selecting one of a plurality of content classes based on the perceived quality metric and one of at least one encoding parameter used to encode the segment of data and a resultant bitrate of the encoded segment of data, wherein the means for separating the blocks of pixels into groups based on at least one difference metric includes one or a combination of: means for separating possible difference metrics into groups, wherein at least a portion of the groups include two or more difference metrics; means for pre-computes quality metrics associated with each of the groups, wherein the quality metrics for the groups is equal to an average of quality metrics corresponding to each of the difference metrics associated with the groups; and means for pre-computes weights for each of the groups, wherein the weights for each of the groups are computed based on at least a portion of the difference metrics associated with the bins.

In certain aspects, a machine readable medium having instructions stored thereon, the stored instructions including one or more portions of code, and being executable on one or more machines, the one or more portions of code comprises one or a combination of: code for computing a perceived quality metric for an encoded segment of data associated with digital video data; and code for selecting one of a plurality of content classes based on the perceived quality metric and one of at least one encoding parameter used to encode the segment of data and a resultant bitrate of the encoded segment of data, wherein the code for computing the perceived quality metric further includes one or a combination of: code for separating blocks of pixels of frames of data associated with the segment into groups based on at least one difference metric associated with each of the blocks of pixels; code for associating quality metric values and weight values with each of the groups of blocks of pixels; and code for computing a weighted quality metric for the segment of data based on the quality metric values and weight values associated with of the groups.

The details of one or more examples are set forth in the accompanying drawings and the description below. Other features, objects, and advantages will be apparent from the description and drawings, and from the claims.

DETAILED DESCRIPTION

This disclosure describes encoding techniques for controlling quality of encoded sequences of data. Generally, certain aspects of certain embodiments of the disclosure can be applied to any multimedia stream (i.e., audio, video, pictures, or any data using lossy compression). However, for brevity and without limitation, the certain embodiments of the disclosure are described and illustrated using video, multimedia data. In particular, the techniques of this disclosure attempt to control the perceived quality as experienced by a viewer. The perceived quality as experienced by a viewer may differ based on the content, or properties, of the sequences of data. In other words, sequences encoded using the same encoding parameters may have different perceived qualities based on the content of the sequences. For example, a high motion sports sequence encoded at a quantization parameter (QP) of 36 may look much better than a low motion sequence encoded at the same QP. This may be primarily due to the fact that motion in the sports sequence tends to increase the perceived visual quality at higher QPs. If, on the other hand, the sports sequence was encoded at a lower QP at which the low motion sequence looked good, the perceptual quality may improve, but the cost of increased bitrate outweighs the incremental improvement in perceptual quality. Note that, when the certain embodiments are applied to other multimedia streams (i.e., audio streams), then the perceptual quality might be auditory, instead of visual as with video streams.

This disclosure provides techniques to control the perceived quality of the sequences to try to achieve a desired constant perceptual quality regardless of the content, or properties, of the sequences. As will be described in detail herein, an encoding device implements quality control techniques to associate a sequence segment with a content "class" based on the content of the segment, determine an observed perceptual quality of the sequence segment, and adjust one or more encoding parameters based on the observed perceptual quality and the content class associated with the segment of data. If time permits, the segment of data may be re-encoded using the adjusted encoding parameters. Alternatively, the subsequent segment of data may be initially encoded using the adjusted encoding parameters. In this manner, the segments of data are encoded such that for the observed perceptual quality of the sequence segment converges to the desired perceptual quality.

Figure 1:
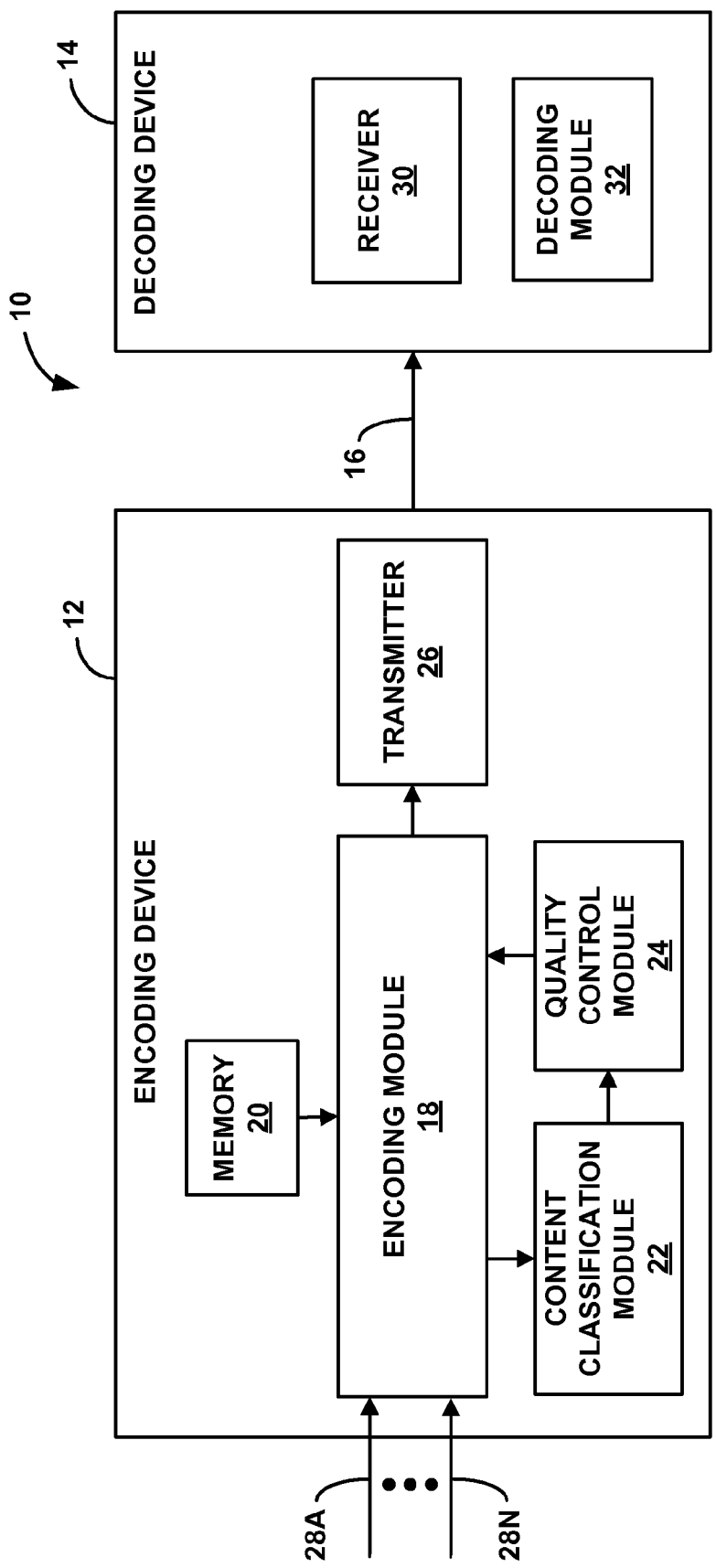
FIG. 1 is a block diagram illustrating a video encoding and decoding system that employs the quality control techniques of this disclosure.

FIG. 1 is a block diagram illustrating a video encoding and decoding system 10 that employs the quality control techniques described herein. Encoding and decoding system 10 includes an encoding device 12 and a decoding device 14 connected by a transmission channel 16. Encoding device 12 encodes one or more sequences of digital video data and transmits the encoded sequences over transmission channel 16 to decoding device 14 for decoding and presentation to a user of decoding device 14. Transmission channel 16 may comprise any wired or wireless medium, or a combination thereof.

Encoding device 12 may form part of a broadcast network component used to broadcast one or more channels of video data. As an example, encoding device 12 may form part of a wireless base station, server, or any infrastructure node that is used to broadcast one or more channels of encoded video data to wireless devices. In this case, encoding device 12 may transmit the encoded data to a plurality of wireless devices, such as decoding device 14. A single decoding device 14, however, is illustrated in FIG. 1 for simplicity.

Decoding device 14 may comprise a user-device that receives the encoded video data transmitted by encoding device 12 and decodes the video data for presentation to a user. By way of example, decoding device 14 may be implemented as part of a digital television, a wireless communication device, a gaming device, a portable digital assistant (PDA), a laptop computer or desktop computer, a digital music and video device, such as those sold under the trademark "iPod," or a radiotelephone such as cellular, satellite or terrestrial-based radiotelephone, or other wireless mobile terminal equipped for video streaming, video telephony, or both.

In some aspects, for two-way communication, encoding and decoding system 10 may support video telephony or video streaming according to the Session Initiated Protocol (SIP), International Telecommunication Union Standardization Sector (ITU-T) H.323 standard, ITU-T H.324 standard, or other standards. Encoding device 12 may generate encoded video data according to a video compression standard, such as Moving Picture Experts Group (MPEG)-2, MPEG-4, ITU-T H.263, or ITU-T H.264. Although not shown in FIG. 1, encoding device 12 and decoding device 14 may be integrated with an audio encoder and decoder, respectively, and include appropriate multiplexer-demultiplexer (MUX-DEMUX) modules, or other hardware, firmware, or software, to handle encoding of both audio and video in a common data sequence or separate data sequences. If applicable, MUX-DEMUX modules may conform to the ITU H.223 multiplexer protocol, or other protocols such as the user datagram protocol (UDP). In some aspects, this disclosure contemplates application to Enhanced H.264 video coding for delivering real-time video services in terrestrial mobile multimedia multicast (TM3) systems using the Forward Link Only (FLO) Air Interface Specification, "Forward Link Only Air Interface Specification for Terrestrial Mobile Multimedia Multicast," published as Technical Standard TIA-1099, August 2006 (the "FLO Specification"). However, the quality control techniques described in this disclosure are not limited to any particular type of broadcast, multicast, or point-to-point system.

As illustrated in FIG. 1, encoding device 12 includes an encoding module 18, a memory 20, a content classification module 22, a quality control module 24, and a transmitter 26. Encoding module 18 receives one or more input video sequences 28A-28N (collectively, "video sequences 28") from one or more sources, and selectively encodes the video sequences 28. Encoding module 18 may, for example, receive video sequences 28 from an image capture device (not shown) integrated within encoding device 12 or coupled to encoding device 12. Alternatively, encoding module 18 may receive video sequences 28 from memory 20. Video sequences 28 may comprise live real-time video, audio, or video and audio sequences to be coded and transmitted as a broadcast or on-demand, or may comprise pre-recorded and stored video, audio, or video and audio flows to be coded and transmitted as a broadcast or on-demand. Although described in the context of real-time services, the techniques of this disclosure may also be applied to near real-time services, non-real time services, or a combination of real-time services, near real-time services and non-real time services. For purposes of illustration, however, this disclosure describes use of the quality control techniques on real-time services.

In some aspects, encoding module 18 may also combine the encoded sequences of data into a transmission frame for transmission via transmitter 26. In particular, encoding module 18 may encode, combine, and transmit portions of video sequences 28 received over a period of time. As an example, encoding module 18 may operate on video sequences 28 on a per second basis. In other words, encoding module 18 encodes one-second segments of data of the plurality of video sequences 28, combines the encoded one-second segments of data to form a superframe of data, and transmits the superframe over transmission channel 16 via transmitter 26. As used herein, the term "superframe" refers to a group of segments of data collected over a time period or window, such as a one-second time period or window. The segments of data may include one or more frames of data. Although the techniques of this disclosure are described in the context of one-second segments of data, the techniques may also be utilized for encoding, combining and transmitting other segments of data, such as for segments of data received over a different period of time, that may or may not be a fixed period of time, or for individual frames or sets of frames of data. In other words, superframes could be defined to cover larger or smaller time intervals than one-second periods, or even variable time intervals.

Note that throughout this disclosure, a particular chuck chunk of multimedia data (e.g., similar to the concept of a superframe) refers to any chunk of multimedia data of a particular size and/or duration, where the particular size and/or duration is based at least in part on the physical layer and/or MAC layer characteristics and/or parameters of the system used for passing on the multimedia data. Note that the particular size and/or duration can be statically and/or dynamically assigned.

Encoding module 18 may attempt to output each of the video sequences 28 at a constant quality level. For example, encoding module 18 may attempt to maintain a constant perceived quality for video sequences 28 regardless of the content, or properties, of video sequences 28. In other words, encoding module 18 may attempt to output each of video sequences 28 at a target quality level. The target quality level may be pre-selected, selected by a user, selected through an automatic process or a semi-automatic process requiring an input from a user or from another process, or selected dynamically by encoding device 12 or system 10 based on predetermined criteria. The target quality level can be selected based on, for example, the type of encoding application, or the type of client device to which the encoded video data is sent.

To maintain the constant perceived quality level, encoding module 18 may select or adjust one or more encoding parameters based on a perceived quality metric and the content of the video sequences. To this end, content classification module 22 classifies the segments of data of the video sequences with one of a plurality of classes. In some cases, content classification module 22 classifies the segments of data after the segments of data have initially been encoded. In such a case, encoding module 18 may encode the segments of data using an initial set of encoding parameters. Encoding module 18 may, for example, initially encode the segment of data using a QP at which the previous segment of data was encoded. Thus, encoding module 18 may operate under the heuristic that two consecutive segments of data of a video sequence have similar content, i.e., the content class of the current segment of data is similar to the content class of the previous segment of data. Alternatively, encoding module 18 may be configured to initially encode all segments of data at a particular QP. For example, encoding module 18 may be configured to initially encode every segment of data at a QP of 33.

To assist in classifying the segments of data, content classification module 22 may compute a perceived quality metric associated with the encoded segment of data. In certain aspects, content classification module 22 may compute a weighted quality metric associated with the encoded segment of data. The weighted quality metric may provide an objective video quality metric that is closer to the subjective quality as experienced by a viewer. Content classification module 22 may compute the weighted quality metric by separating blocks of pixels of one or more frames of data associated with the segment into groups based on difference metrics associated with each of the blocks of pixels, associating quality metrics and weights with each of the groups of blocks of pixels, and computing the weighted quality metric based on the number of blocks of pixels in each of the groups as well as the quality metrics and weights associated with the groups. As described above, the blocks of pixels may be of any size, such as the sizes specified in the H.264 standard.

Additionally, content classification module 22 may analyze the content of the encoded segment of data to associate the segment of data with one of a plurality of content classes. In certain aspects, the content classes may comprise one or more curves that model a quality metric, such as peak signal to noise ratio (PSNR), as a function of a bitrate. Content classification module 22 may select the one of the curves that most closely corresponds to the encoded segment of data based on the perceived quality metric and at least one of the encoding parameters (e.g., bitrate, QP, or the like) used to encode the segment of data. In instances where the encoding parameters do not match those used to generate the content classes, content classification module 22 may normalize the encoding parameters used to encode the segment of data and use at least one of the normalized encoding parameters and the perceived quality metric to select the one of the curves most closely corresponding to the encoded segment. Alternatively, content classification module 22 may select the one of the curves that most closely corresponds to the encoded segment of data based on the perceived quality metric and a resultant bitrate of the encoded segment of data (i.e., a bitrate achieved using a particular set of encoding parameters).

In another aspect, the content classes may comprise classes based on complexity (e.g., spatial complexity and/or temporal complexity) of the data of the segment. Content classification module 22 may classify texture information, e.g., contrast ratio values, into categories of "high," "medium," and "low" (on an x-axis) and classify motion information, e.g., motion vectors, into categories of "high," "medium," and "low," (on a y-axis), and classify the segment of data with one of the classes based on a point of intersection between the motion categories and the texture categories. The class to which the segment of data is associated may correspond with a particular quality-rate curve. Alternatively, the class to which the segment of data is associated may correspond to one or more encoding parameters. One such content classification method is described in co-pending and commonly assigned U.S. patent application Ser. No. 11/373,577, entitled "CONTENT CLASSIFICATION FOR MULTIMEDIA PROCESSING" and filed on Mar. 10, 2006, the entire content of which is incorporated herein by reference.

Quality control module 24 determines a target quality associated with the content class to which the segment of data belongs. In some cases, conventional quality metrics, such as PSNR, do not always accurately measure the perceptual visual video quality as experienced by a viewer. In these cases, the target quality metric associated with each of the content classes may differ. In particular, quality control module 24 may adjust the target quality metric associated with each of the content classes to account for the fact that sequences of different content classes appear perceptually different at the same PSNR.

Quality control module 24 compares the perceived quality metric (e.g., the weighted quality metric) to the target quality metric. If the difference between the perceived quality metric and the target quality metric exceeds a threshold, quality control module 24 adjusts at least one of the encoding parameters. For example, if the perceived quality metric is greater than the target quality metric by the threshold, quality control module 24 increases a QP used for encoding the segment of data. Likewise, if the perceived quality metric is less than the target quality metric by the threshold, quality control module 24 decreases a QP used for encoding the segment of data. Quality control module 24 may adjust encoding parameters other than QP, such as frame rate, encoding modes, deblocking, coefficient trimming, motion vector refinement and the like.

After quality control module 24 adjusts the encoding parameters, encoding module 18 may perform a second pass encoding on the segment of data using the adjusted encoding parameters. For example, encoding module 18 may re-encode the segment of data at the adjusted QP. The second pass encoding effectively refines the perceived quality metric towards the desired target quality metric. Moreover, the second pass encoding may re-establish the content class of the video sequence. In certain aspects, encoding module 18 may only perform the second pass encoding when computation processing time permits. In another aspect, encoding module 18 may perform more than two encoding passes in an attempt to refine the observed quality.

After encoding module 18 has performed the last encoding pass, e.g., after the second encoding pass or after the first encoding pass if encoding module 18 does not need re-encode, encoding device 12 transmits the encoded segments of data via transmitter 26. Transmitter 26 may include appropriate modem and driver circuitry to transmit encoded video over transmission channel 16. For wireless applications, transmitter 26 includes RF circuitry to transmit wireless data carrying the encoded video data.

Decoding device 14 receives the encoded data via receiver 30. Like transmitter 26, receiver 30 may include appropriate modem and driver circuitry to receive encoded video over transmission channel 16, and may include RF circuitry to receive wireless data carrying the encoded video data in wireless applications. In some examples, encoding device 12 and decoding device 14 each may include reciprocal transmit and receive circuitry so that each may serve as both a source device and a receive device for encoded video and other information transmitted over transmission channel 16. In this case, both encoding device 12 and decoding device 14 may transmit and receive video sequences and thus participate in two-way communications. In other words, the illustrated components of multimedia encoding device 10 may be integrated as part of an encoder/decoder (CODEC).

Decoding module 32 decodes the encoded segments of data for presentation to a user. Decoding device 14 may further present the decoded segments of data to a user via a display (not shown) that may be either integrated within decoding device 14 or provided as a discrete device coupled to decoding device 14 via a wired or wireless connection.

The components in encoding device 12 and decoding device 14 are exemplary of those applicable to implement the techniques described herein. Encoding device 12 and decoding device 14, however, may include many other components, if desired. For example, encoding device 12 may include a plurality of encoding modules that each receive one or more sequences of video data and encode the respective sequences of video data in accordance with the techniques herein. In this case, encoding device 12 may further include at least one multiplexer to combine the segments of data for transmission. In addition, encoding device 12 and decoding device 14 may include appropriate modulation, demodulation, frequency conversion, filtering, and amplifier components for transmission and reception of encoded video, including radio frequency (RF) wireless components and antennas, as applicable. For ease of illustration, however, such components are not shown in FIG. 1.

The components in encoding device 12 and decoding device 14 may be implemented as one or more processors, digital signal processors, application specific integrated circuits (ASICs), field programmable gate arrays (FPGAs), discrete logic, software, hardware, firmware, or any combinations thereof. Depiction of different features as modules is intended to highlight different functional aspects of encoding device 12 and decoding device 14 and does not necessarily imply that such modules must be realized by separate hardware or software components. Rather, functionality associated with one or more modules may be integrated within common or separate hardware or software components. Thus, the disclosure should not be limited to the example of encoding device 12 and decoding device 14.

Figure 2:
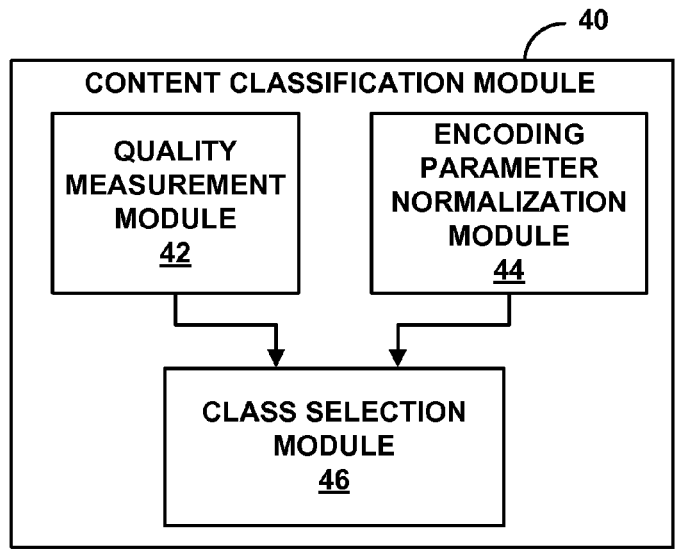
FIG. 2 is a block diagram illustrating an exemplary content classification module that associates a segment of data with one of a plurality of content classes.

FIG. 2 is a block diagram illustrating an exemplary content classification module 40 that associates a segment of data with one of a plurality of content classes in accordance with the techniques described herein. Content classification module 40 may, for example, represent content classification module 22 of encoding device 12 (FIG. 1). Content classification module 40 includes a quality measurement module 42, an encoding parameter normalization module 44, and a class selection module 46.

As described above, encoding module 18 (FIG. 1) performs a first pass encoding of the received segment of data. The first pass encoding of the segment of data may be performed using encoding parameters used for encoding the previous segment of data. Alternatively, the first pass encoding of the segment of data may be performed using the adjusted encoding parameters of the previous segment of data, even if the previous segment of data was not re-encoded using the adjusted encoding parameters. As another example, the first pass encoding of the segment of data may be performed using a configured set of encoding parameters. After the first pass encoding, content classification module 40 associates the segment of data with one of a plurality of content classes. To do so, content classification module 40 may associate the segment of data with one of the content classes based on a perceived quality metric of the encoded segment of data and either one or more encoding parameters that corresponds with the parameters used for generating the classes or a resultant bitrate of the encoded segment of data. As described below, in some aspects the one or more encoding parameters may be normalized to correspond with the encoding parameters used to generate the content classes.

Quality measurement module 42 computes the perceived quality metric for the encoded segment of data. The perceived quality metric may, for example, be an observed PSNR, a weighted PSNR, Mean Opinion Score (MOS), or other quality metric. In computing the perceived quality metric, quality measurement module 42 may account for the fact that conventional quality metrics, such as PSNR, are not always an accurate measure of the perceptual video quality as experienced by a viewer. This is especially true for low intensity sequences or frames, where the average frame PSNR is biased by the low intensity areas which have low mean square errors. These areas do not typically contribute to the overall perceptual video quality because the human visual system does not perceive them as areas of interest.

To address this problem, quality measurement module 42 computes a weighted quality metric (e.g., weighted PSNR). The weighted quality metric provides an objective video quality metric that more closely resembles the subjective quality as perceived by a viewer than conventional PSNR. To compute the weighted quality metric, quality measurement module 42 separates blocks of pixels of one or more frames of data of the segment into groups based on at least one difference metric associated with each of the blocks of pixels. Quality measurement module 42 may, for example, group the blocks of pixels of one or more frames of data into groups based on sum of absolute differences (SADs), SADs per pixel (SPPs), sum of squared differences (SSDs), or similar difference metric associated with each of the blocks of pixels. Other examples may use sum of absolute transformed difference (SATD), or sum of squared transformed difference (SSTD). For exemplary purposes, this disclosure discusses separating the blocks of pixels of one or more frames of data into groups based on SPP values associated with each of the blocks of pixels. It should be apparent, however, that quality measurement module 42 may separate the blocks of pixels into groups based on other difference metrics.

Quality measurement module 42 computes SPP values for the blocks of pixels at least based on a block mode decision. Quality measurement module 42 may, for example, compute an SPP value for the block of pixels in accordance with the equation:

$$SPP = \sum_{i=0}^{n-1} (SAD_i)/n, \quad (1)$$

where SPP is the SPP value computed for the block of pixels, SADi is the SAD value for the ith pixel of the block of pixels, and n is the number of pixels in the block of pixels. The SPP values associated with each of the block of pixels range from zero to n. For a 16×16 block of pixels, where n is equal to 256, the SPP values associated with the blocks of pixels range from 0 to 255. An SPP value of zero indicates that a predicted block of pixels and the original block of pixels are exactly the same. On the other hand, an SPP value of 255 indicates the opposite extreme, i.e., that the predicted block of pixels and the original block of pixels are extremely different.

Quality measurement module 42 may pre-compute a quality metric associated with each SPP value. For exemplary purposes, the techniques of this disclosure will be discussed in terms of a PSNR quality metric. However, it should be understood that the techniques may be utilized using any quality metric. Quality measurement module 42 may pre-compute a PSNR value associated with each of the SPP values. In one example, quality measurement module 42 may pre-compute the PSNR value associated with each of the SPP values according to the equation:

$$PSNR_i = 10 \log_{10}(2^n - 1)/SPP_i^2, \quad (2)$$

where $PSNR_i$ is the PSNR value associated with the $i^{th}$ SPP value and $SPP_i$ is the $i^{th}$ SPP value.

Quality measurement module 42 separates the entire range of SPP values into a plurality of groups, with each of the groups corresponding to one or more SPP values. In one example, quality measurement module 42 may separate the entire range (0 . . . 255) of SPP values into 64 groups, with each of the groups representing four consecutive SPP values. Alternatively, quality measurement module 42 may group non-consecutive SPP values into a plurality of groups. Quality measurement module 42 associates a quality metric, e.g., a PSNR value, with each of the groups. For instance, quality measurement module 42 averages the PSNR values associated with each of the SPP values belonging to the groups to obtain an average PSNR value for each of the groups.

Quality measurement module 42 may further associate a weight with each of the groups. In certain aspects, quality measurement module 42 may associate a weight computed using a logarithmic weight function with each of the groups. The logarithmic weight function may be a function of the SPP values corresponding with the groups. Quality measurement module 42 may determine the weight to associate with each of the groups according to the equation:

$$Wt_i = \log_{10}(SPP_j), \quad (3)$$

where $Wt_i$ is the weight associated with the $i^{th}$ group, $SPP_j$ is the SPP value of the $j^{th}$ pixel, k=0, 1, . . . , 64 in the case of sixty-four separate groups, and j is the highest SPP value associated with $i^{th}$ group. In the case of a 16×16 block of pixels with sixty-four groups j=3, 7, 11 . . . , 255. The weight associated with each of the groups assists in adjusting a block count for each group. In other words, the weight indicates the number of blocks within each of the groups that should count towards the computed PSNR of the segment of data. The weight function assigns higher weights to the groups which have higher SPP values.

As described above, the segment of data may include one or more frames of data that include one or more blocks of pixels. Quality measurement module 42 separates the blocks of pixels of the frames of the segment of data into one of the groups based on the SPP values associated with the blocks of pixels. After all of the blocks of pixels of the segment of data have been grouped, quality measurement module 42 computes a percentage of blocks of pixels per group. In certain aspects, blocks of pixels that are determined to be skipped are excluded from the percentage of blocks of pixels per group computation. Quality measurement module 42 computes the weighted quality metric for the segment of data based on the percentage of blocks of pixels per group, the quality metrics associated with the groups and the weights associated with the groups. In one example, quality measurement module computes the weighted quality metric according to the equation:

$$Wt\_Q = \Sigma(Wt[i] * MBPerc[i] * Group\_Q[i])/TotalMBCnt, \quad (4)$$

where $Wt\_Q$ is the weighted quality metric, i=0, 1, . . . , n, n is equal to the number of groups, Wt[i] is the weight associated with the $i^{th}$ group, MBPerc[i] is a percentage of total number of blocks of the segment included in the $i^{th}$ group, Group_Q[i] is the quality metric associated with the $i^{th}$ group, and TotalMBCnt is a total number of blocks of pixels in the segment of data. TotalMBCnt is calculated using the equation:

$$TotalMBCnt = \Sigma(Wt[i] * MBPerc[i]) \quad (5)$$

over all i groups. By computing a quality metric for the segment of data in the manner described above, an objective video quality metric may be closer to the subjective quality experienced by a viewer relative to conventional quality metrics.

In the case in which the encoding parameters used to encode the segment of data do no match the encoding parameters used to generate the content classes, content classification module 40 may normalize one or more of the encoding parameters to correspond with the encoding parameters used to generate the content classes. In certain aspects, encoding parameter normalization module 44 normalizes a bitrate used to encode the segment of data to correspond to the parameters used to generate the content classes. Normalizing the bitrate may reduce the effect that the actual sequence of frame types and frame rate of the segment of data, and the QP used during encoding of the segment data have on the bitrate.

In certain aspects, the content classes may comprise quality-rate curves that model a quality metric, such as PSNR, as a function of a bitrate. In this case, the encoding parameters are normalized to the parameters used for generating the quality-rate curves. For example, encoding parameter normalization module 44 may normalize the bitrate used to encode the segment of data to the bitrate used to generate the quality-rate curves in accordance with the following equation and table $$R = \gamma_{FPS}(\phi_I * Rate_I + \phi_P * Rate_P + \phi_B * Rate_B) \quad (6)$$

where R is the normalized bitrate, $\gamma_{FPS}$ is a scaling factor used to scale the bitrate to its 30 frame per second (fps) equivalent, $\phi_I$ is a scaling factor used to scale the bitrate of I frames to a setpoint QP equivalent, $Rate_I$ is an observed bitrate of the I frames of the segment of data, $\phi_P$ is a scaling factor used to scale the bitrate of P frames to a setpoint QP equivalent, $Rate_P$ is an observed bitrate of the P frames of the segment of data, $\phi_B$ is a scaling factor used to scale the rate of B frames to a setpoint QP equivalent, and $Rate_B$ is an observed bitrate of the B frames of the segment of data. In other words, the observed bitrate of the I frames of the segment of data ($Rate_I$), the observed bitrate of the P frames of the segment of data ($Rate_P$) and the observed bitrate of the B frames of the segment of data ($Rate_B$) correspond to the number of total bits used to encode the I frames of the segment of data, the number of bits used to encode the P frames of the segment of data and the number of bits used to encode the B frames of the segment of data, respectively. TABLE 1 illustrates some exemplary scaling factors (e.g., $\phi_P$ and $\phi_B$) used to scale the rates to a QP 33 equivalent. TABLE 2 illustrates some exemplary scaling factors used to scale the bitrate to its 30 fps equivalent.

TABLE 1

Rate Scaling Factors Based on QP

| Frame QP | Bitrate Scaling Factor, $\phi$ |
|---|---|
| 28 | 0.517144638 − 0.003383 |
| 29 | 0.578015199 + 0.001467 |
| 30 | 0.690270107 − 0.002671 |
| 31 | 0.753518595 + 0.001542 |
| 32 | 0.860616347 + 0.001733 |
| 33 | 1 |
| 34 | 1.099142284 + 0.000496 |
| 35 | 1.231770493 + 0.009451 |

TABLE 1-continued

Rate Scaling Factors Based on QP

| Frame QP | Bitrate Scaling Factor, $\phi$ |
|---|---|
| 36 | 1.531040155 − 0.031693 |
| 37 | 1.644054502 − 0.032849 |
| 38 | 1.853428794 − 0.018959 |
| 39 | 2.115798762 − 0.061861 |
| 40 | 2.318844143 − 0.052601 |

TABLE 2

Rate Scaling Factors based on FPS

| Operating FPS | Bitrate Scaling Factor, $\gamma FPS$ |
|---|---|
| 30 | 1.0 |
| 24 | 1.142 |
| 15 | 1.43 |

Class selection module 46 associates the segment of data with one of the plurality of content classes based on the perceived quality metric (in this case the weighted quality metric) as well as either one or more encoding parameters that corresponds with the parameters used for generating the classes or a resultant bitrate of the encoded segment of data. As described above, the content classes may associate the segments of data with respective quality and rate information. For example, class selection module 46 may be configured with a plurality of quality-rate curves that model a quality metric as a function of a bitrate. Thus, the quality-rate curves may comprise the content classes. The quality-rate curves may be computed offline by measuring a bitrate and quality metric for different types of content at different QPs, clustering the results and performing curve-fitting. For example, the quality-rate curves may be modeled using a logarithmic function of the form:

$$Q = \alpha * \ln(r) + \beta, \quad (7)$$

where Q is the quality metric, r is the bit rate, and $\alpha$ and $\beta$ are constants computed using a number of sample data points. As an example, the quality-rate curves may correspond to eight different classes associated with varying levels of motion and texture in the content of the segments of data. TABLE 3 below illustrates some example constants $\alpha$ and $\beta$ for the quality-rate curves illustrated in FIG. 3. Curve ID values 0-7 correspond to curves 48A-48H ("curves 48"), respectively.

TABLE 3

Quality-rate Curve Constants

| Curve ID | $\alpha$ | $\beta$ |
|---|---|---|
| 0 | 5.0874 | 24.87129 |
| 1 | 5.1765 | 28.62093 |
| 2 | 5.9369 | 39.48376 |
| 3 | 5.2884 | 31.56214 |
| 4 | 5.3435 | 34.54844 |
| 5 | 5.1642 | 32.81238 |
| 6 | 5.0773 | 32.41378 |
| 7 | 5.0813 | 34.78407 |

To associate the segment of data with the corresponding quality-rate curve (i.e., content class), class selection module 46 selects the one of the quality-rate curves based on the perceived quality metric, e.g., the weighted quality metric, and either one or more encoding parameters that corresponds with the parameters used for generating the classes or a resultant bitrate of the encoded segment of data. Using a normalized bitrate as an example, class selection module 46 may compute a quality metric for each of the quality rate curves corresponding to the normalized bitrate. For example, class selection module 46 may compute the quality metric for each of the quality-rate curves in accordance with equation (7), using the normalized bitrate computed by encoding parameter normalization module 44 and the quality-rate constants specified in TABLE 3. In other words, class selection module 46 computes the quality metric for each of the quality-rate curves at the normalized bitrate.

Class selection module 46 selects the quality-rate curve (i.e., class) that most closely corresponds with the segment of data. For example, class selection module 46 determines which of the quality metrics computed using the normalized encoding parameters, e.g., bitrate, is closest to the weighted quality metric computed by quality measurement module 42. Class selection module 46 may compute, for each of the plurality of quality-rate curves, a difference between the perceived quality metric and a quality metric on the respective quality-rate curve at the normalized bitrate, and select the one of the quality-rate curves that corresponds to the smallest difference. Thus, class selection module 46 selects the quality-rate curve that minimizes abs(Wt_Q−$Q_i$), where Wt_Q is the weighted quality metric and $Q_i$ is the quality metric associated with the $i^{th}$ class or curve.

Figure 3:
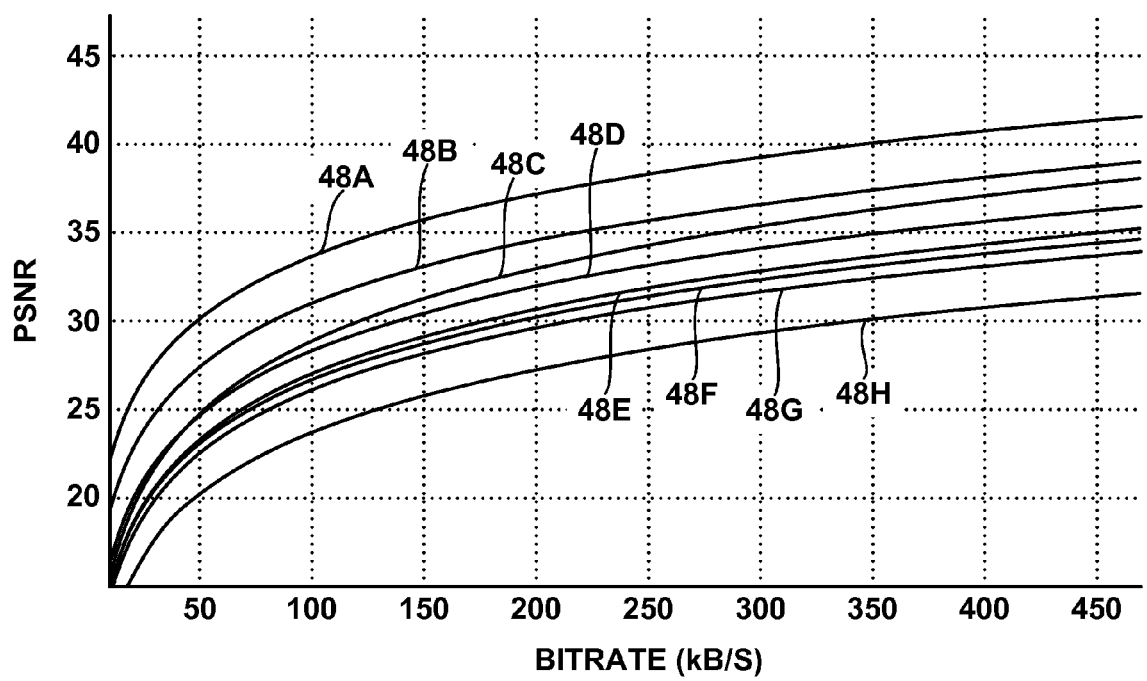
FIG. 3 is a graph illustrating exemplary quality-rate curves that represent content classes.

FIG. 3 is a graph illustrating exemplary quality-rate curves 48 that represent content classes. Quality-rate curves 48 illustrated in FIG. 3 are modeled using the logarithmic function (Equation 7) and the quality-rate constants illustrated in TABLE 3. As described above, quality-rate curves 48 may be computed offline by measuring a bitrate and quality metric for different types of content encoded at different QPs, clustering the results and performing curve-fitting.

Each of quality-rate curves 48 corresponds to a different content class associated with varying levels of motion and texture in the content of the segments of data. In particular, quality-rate curve 48A corresponds to low motion and low texture content. Quality-rate curve 48H corresponds to high motion and high texture content. Quality-rate curves 48 illustrated in FIG. 3 are only exemplary curves. Similar curves may be generated based on other quality-rate constants or other modeling equations.

Figure 4:
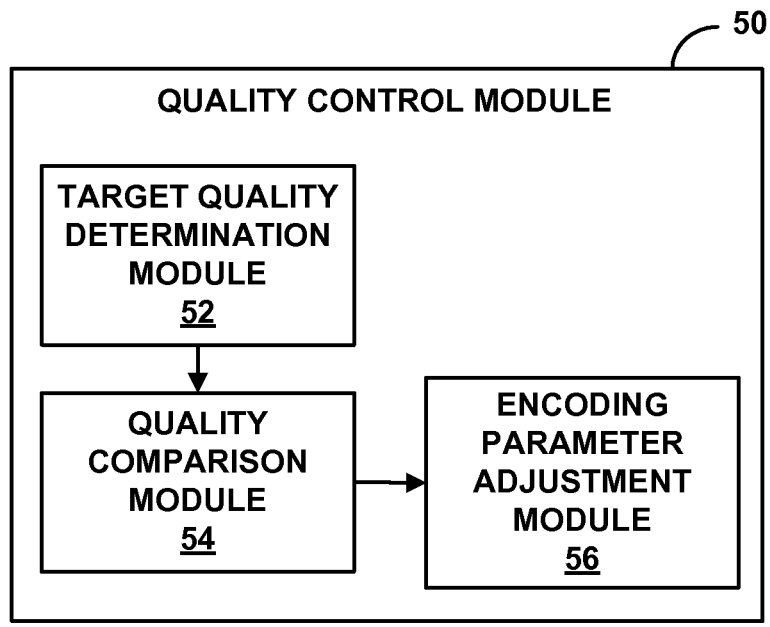
FIG. 4 is a block diagram illustrating an exemplary quality control module that dynamically adjusts one or more encoding parameters using to encode a segment of data.

FIG. 4 is a block diagram illustrating an exemplary quality control module 50 that dynamically adjusts one or more encoding parameters using to encode segments of data. Quality control module 50 may, for example, represent quality control module 24 of encoding device 12 (FIG. 1). Quality control module 50 includes a target quality determination module 52, a quality comparison module 54 and an encoding parameter adjustment module 56.

Target quality determination module 52 determines a target quality metric of the segment of data based on the content classification. In other words, target quality determination module 52 determines a target quality level at which encoding module 18 (FIG. 1) should encode the segment of data. The target quality metric may, for example, comprise a target PSNR at which to encode the segment of data. As described above, conventional PSNR is not always an accurate measurement of perceptual video quality as experienced by a viewer. Thus, target quality determination module 52 may dynamically adjust the target quality metric based on the content classification to account for the fact that sequences of different content classes appear perceptually similar at different PSNRs. Target quality determination module 52 may compute the desired target quality metric using the equation:

$$\text{Target}\_Q = \text{SetPoint} + \Delta Q_i, \quad (8)$$

where Target_Q is the desired target quality metric, SetPoint is an initial target quality metric, and $\Delta Q_i$ is the quality adjustment delta corresponding with the ith content class.

TABLE 4, below, shows exemplary quality adjustment deltas and desired target quality metrics (in this case PSNR) for a plurality of curves. The values computed in TABLE 4 are computed using a SetPoint PSNR of 33. As in TABLE 3 above, the curve ID values 0-7 may correspond to curves 48A-48H ("curves 48") of FIG. 3.

TABLE 4

Desired Target PSNR for Setpoint of 33

| Curved Id | PSNR Adjust Delta | Desired Target PSNR |
|---|---|---|
| 0 | 3 | 36 |
| 1 | 3 | 36 |
| 2 | 2 | 35 |
| 3 | 1 | 34 |
| 4 | 0 | 33 |
| 5 | −1 | 32 |
| 6 | −2 | 31 |
| 7 | −3 | 30 |

As illustrated in TABLE 4, the desired target PSNR for the curves corresponding to low motion and low texture content is adjusted to be higher than the initial target quality (i.e., SetPoint) while the desired target PSNR for the curves corresponding to high motion and high texture content is adjusted to be lower than the initial target quality. In certain aspects, the initial target quality (i.e., SetPoint) may correspond to a quality metric associated with a medium motion, medium texture segment of data.

Quality comparison module 54 compares the computed target quality metric with a perceived quality metric, which is the actual quality level at which the segment of data is encoded. In certain aspects, the perceived quality metric may comprise the weighted quality metric computed by quality measurement module 42 (FIG. 2). Quality comparison module 54 may, for example, receive the weighted quality metric from quality measurement module 42. Alternatively, quality comparison module 54 may compute the weighted quality metric as described in detail above with respect to FIG. 2.

If the difference between the perceived quality metric, e.g., weighted quality metric, and the target quality metric exceeds a threshold value, quality comparison module 54 alerts encoding parameter adjustment module 56. Encoding parameter adjustment module 56 then adjusts at least one encoding parameter used to encode the segment of data. For example, if the perceived quality metric is greater than the desired target quality metric by a threshold, encoding parameter adjustment module 56 may increase the QP at which the segment of data is encoded. Likewise, if the perceived quality metric is less than the desired target quality metric by a threshold, encoding parameter adjustment module 56 may decrease the QP at which the segment of data is encoded. QP encoding parameter adjustment module 56 may adjust the QP at which the segment of data is encoded (either up or down) by the difference between the perceived quality metric and the target quality metric. Alternatively, QP encoding parameter adjustment module 56 may adjust the QP at which the segment of data is encoded at finer increments when computation processing time permits. Although described herein in terms of adjusting QPs used to encode the segments of data, encoding parameter adjustment module 56 may adjust other encoding parameters, such as frame rate, encoding modes, deblocking, coefficient trimming, motion vector refinement and the like.

Encoding parameter adjustment module 56 compares the adjusted encoding parameters with an acceptable range of encoding parameters (hereinafter, "acceptable encoding parameter range"). The acceptable encoding parameter range may differ based on the content class associated with the segment of data. TABLE 5 shows exemplary acceptable encoding parameter ranges for QP values for the content classes associated with the quality-rate curves illustrated in FIG. 3.

TABLE 5

Acceptable QP Ranges for SetPoint of 33

| Curve ID | Min QP | Max QP |
|---|---|---|
| 0 | 30 | 33 |
| 1 | 30 | 36 |
| 2 | 30 | 38 |
| 3 | 30 | 38 |
| 4 | 30 | 38 |
| 5 | 31 | 38 |
| 6 | 34 | 38 |
| 7 | 35 | 38 |

As illustrated in TABLE 5, the acceptable encoding parameter ranges vary based on the content class (e.g., quality-rate curve) associated with the segment of data. In particular, the acceptable QP range corresponding to the content class corresponding to low motion and low texture content (e.g., curve ID 0) and the content class correspond to high motion and high texture content (e.g., curve ID 7) have a smaller sized range of acceptable QP values than the content classes that include medium texture and medium motion (e.g., curve IDs 2-4). The content classes associated with the more extreme ends of the motion and texture content have ranges of only four acceptable QP values, whereas the content classes associated with more medium motion and texture have ranges of up to nine acceptable QP values.

Moreover, TABLE 5 also illustrates an additional relationship between the QP and the content. The acceptable QP range of content of the segment of data that includes high motion and high texture content is higher than the acceptable QP range of content of the segment of data that includes low motion and low texture. As illustrated in TABLE 5, there is a difference of five QP values between the high motion, high texture content and the low motion, low texture content.

If encoding parameter adjustment module 56 determines that the adjusted encoding parameter are outside of the range of acceptable encoding parameters, encoding parameter adjustment module 56 re-adjusts the encoding parameter to be within the acceptable encoding parameter range. If the adjusted QP value for a segment of data that corresponds to curve ID 0 is equal to twenty-eight, for example, encoding parameter adjustment module 56 may re-adjust the QP value for the segment of data to thirty, which is within the acceptable QP range for the content class corresponding to quality-rate curve ID 0.

Quality control module 50 provides the adjusted encoding parameters to encoding module 18 (FIG. 1). Encoding module 18 may perform a second pass encoding on the segment of data using the adjusted encoding parameters if sufficient processing time permits. In this manner, quality control module 50 dynamically adjusts the perceived quality at which the segments of data are encoded in an attempt to maintain a constant quality. Moreover, encoding module 18 may use the adjusted encoding parameters to encode a subsequent segment of data. This is true even if encoding module 18 does not re-encode the previous segment of data.

Figure 5:
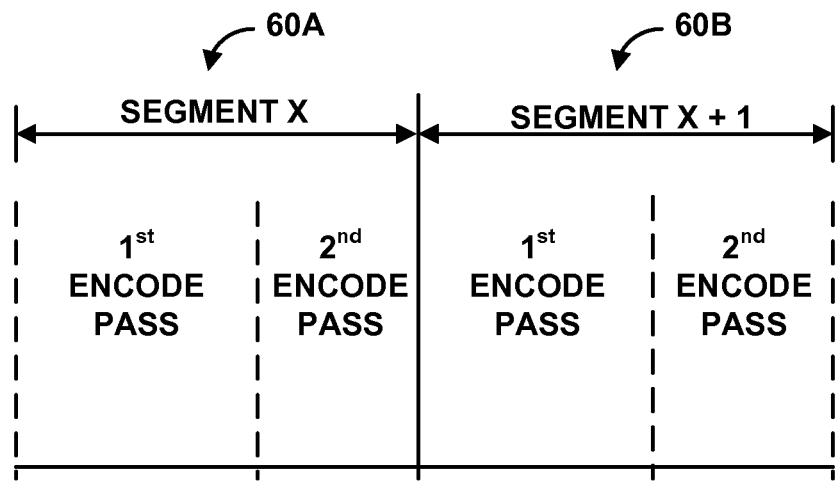
FIG. 5 is a diagram illustrating an exemplary encoding technique for encoding segments of data in accordance with techniques of this disclosure.

FIG. 5 is a diagram illustrating an exemplary encoding technique for encoding segments of data in accordance with techniques of this disclosure. The encoding techniques illustrated in FIG. 5 may, for example, be performed by encoding device 12 (FIG. 1). The example illustrated in FIG. 5 shows encoding of segments of data 60A and 60B. However, the techniques may be extended to any number of segments of data.

Initially, encoding device 12 may perform a first pass to encode segment of data 60A using an initial set of encoding parameters. Encoding device 12 may, for example, initially encode segment of data 60A using a configured QP or a QP determined based on the content, or properties, of segment of data 60A. As described in detail above, encoding device 12 analyzes the content of the encoded segment of data to associate segment of data 60A with one of a plurality of content classes and determines whether to adjust one or more encoding parameters based on a perceived quality metric of the encoded segment of data and a target quality metric corresponding to the associated content class. Encoding device 12 may, for example, determine that an adjustment is desired when the difference between the perceived quality metric and the target quality metric exceeds a threshold.

When an adjustment is desired, encoding device 12 adjusts at least one encoding parameter for segment of data 60A and performs a second pass to encode segment of data 60A using the adjusted encoding parameters. The second pass encoding effectively refines the perceived quality metric towards the desired target quality metric, and may re-establish the content class of the video sequence. Although only two encoding passes are performed in the example illustrated in FIG. 5, encoding device 12 may perform more than two encoding passes when computing process time permits. Moreover, if processing time does not permit, encoding device 12 may not re-encode the segment of data using the adjusted encoding parameters, but instead use the adjusted encoding parameters to encode the subsequent segment of data, i.e., segment of data 60B. Encoding device 12 transmits encoded segment of data 60A.

Encoding device 12 may perform a first pass encode of segment of data 60B using the encoding parameters that were used to encode segment of data 60A during the second pass encoding. If no second coding pass was performed on segment of data 60A, encoding device 12 may perform the first pass encode segment of data 60B using the encoding parameters that were used to during the first pass encode of segment of data 60A. Alternatively, encoding device 12 may encode segment of data 60B using the adjusted encoding parameters computed for the segment of data 60A even though no re-encoding of segment of data 60A was performed. In this manner, encoding device 12 operates under the heuristic that the content is similar between two consecutive segments of data.

Encoding device 12 again analyzes the content of the encoded segment of data to associate segment of data 60B with one of a plurality of content classes, determines whether to adjust the encoding parameters based on a perceived quality metric of the encoded segment of data and a target quality metric corresponding to the associated content class, and adjusts at least one encoding parameter for segment of data 60B when the adjustment is desired. Encoding device 12 then performs a second pass encoding of segment of data 60B using the adjusted encoding parameters, which again refines the perceived quality metric towards the desired target quality metric.

Figure 6:
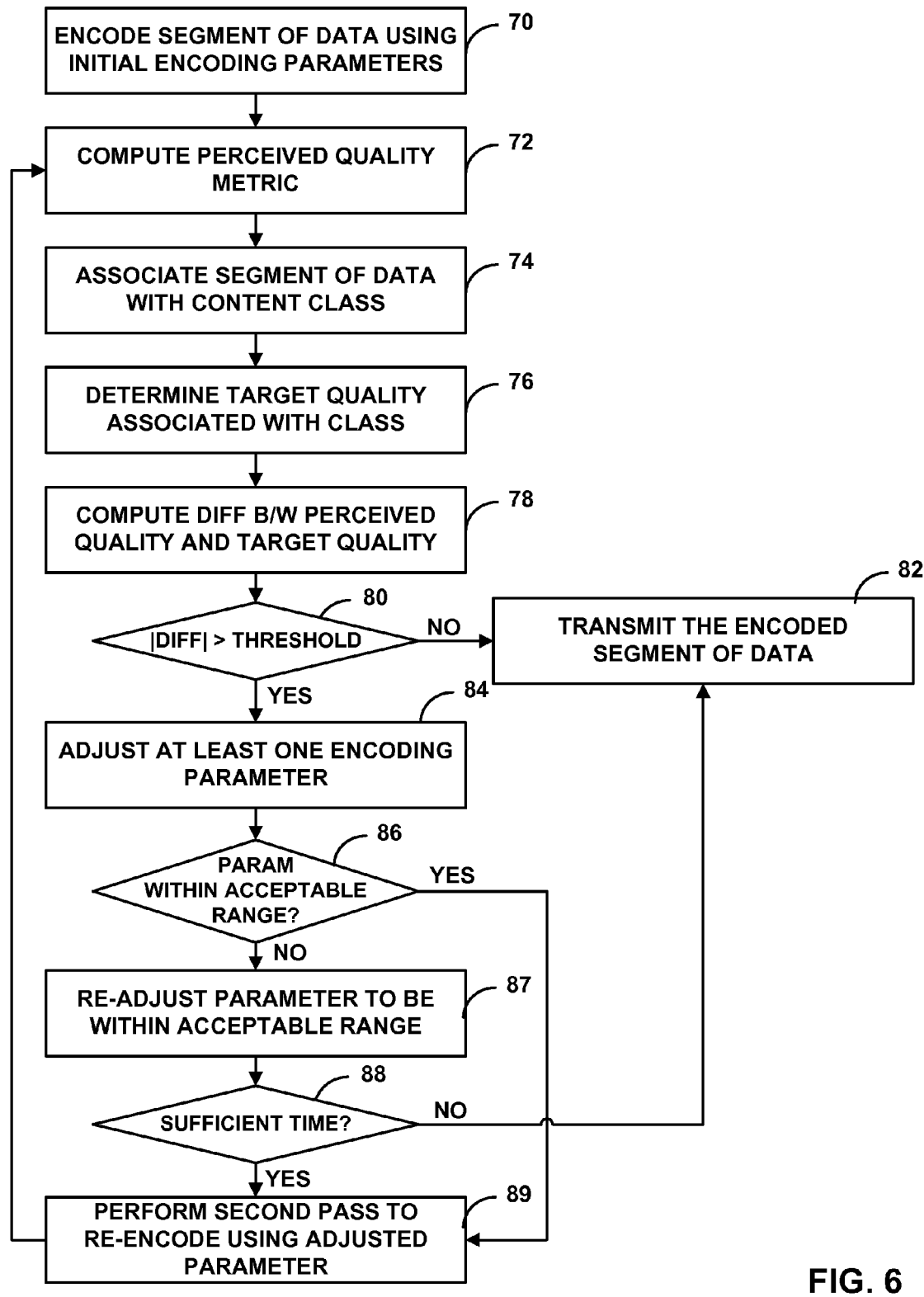
FIG. 6 is a flow diagram illustrating exemplary operation of an encoding device controlling the quality of an encoded segment of data in accordance with techniques of this disclosure.

FIG. 6 is a flow diagram illustrating exemplary operation of encoding device 12 controlling the quality of encoded segments of data in accordance with techniques of this disclosure. Initially, encoding module 18 encodes the segment of data using an initial set of encoding parameters (70). Encoding module 18 may, for example, encode the segment of data using adjusted encoding parameters computed for the previous segment of data. These adjusted encoding parameters may or may not be the encoding parameters used to encode the previous segment of data. For example, if processing time did not permit, the previous segment of data may be encoded using different encoding parameters. In this manner, encoding module 18 may operate under the heuristic that the content class is similar between two consecutive segments of data. Alternatively, encoding module 18 may be configured to initially encode all segments of data using configured encoding parameters. In another example, encoding module 18 may select initial encoding parameters at which to encode the segments of data based on the content, or properties, of the segment of data.

Encoding device 12 computes a perceived quality metric of the encoded segment of data (72). In certain aspects, encoding device 12 may compute a weighted quality metric associated with the encoded segment of data that provides an objective video quality metric that is closer to the subjective quality as experienced by a viewer than conventional quality metrics. As described in detail above, encoding device 12 may compute the weighted quality metric by separating blocks of pixels of one or more frames of data associated with the segment into groups based on one or more difference metrics associated with each of the blocks of pixels, associating quality metrics and weights with each of the groups of blocks of pixels, and computing the weighted quality metric based on the number of blocks of pixels in each group as well as the quality metrics and weights associated with the groups.

Content classification module 22 associates the segment of data with one of a plurality of content classes (74). In certain aspects, the content classes may comprise one or more curves that model a quality metric, such as peak signal to noise ratio (PSNR), as a function of a bitrate. Content classification module 22 may select the one of the curves that most closely corresponds to the encoded segment of data based on the perceived quality metric and at least one of the encoding parameters (e.g., bitrate, QP, or the like) used to encode the segment of data. To assist in the association of the segment of data with one of the content classes, content classification module 22 may compute one or more normalized encoding parameters at which the segment of data was encoded to correspond to the parameters used to generate the quality-rate curves when the encoding parameters used to encode the segment of data are different than the encoding parameters used to generate the plurality of quality-rate curves. Content classification module 22 may then associate the segment of data with one of the content classes based on the perceived quality metric and the normalized encoding parameters. For example, content classification module 22 may select the quality-rate curve that has a quality metric at a normalized bitrate that is closest to the computed weighted quality metric. Alternatively, content classification module 22 may select the one of the curves that most closely corresponds to the encoded segment of data based on the perceived quality metric and a resultant bitrate of the encoded segment of data (i.e., a bitrate achieved using a particular set of encoding parameters).

Quality control module 24 determines a target quality metric associated with the content class to which the segment of data belongs (76). Quality control module 24 may, for example, compute the target quality metric using equation (8) and the parameters of TABLE 4 for a set point of a PSNR value of 33. Quality control module 24 computes a difference between the weighted quality metric to the target quality metric (78) and compares the absolute value of the difference to a threshold (80). In other words, quality control module 24 determines whether the observed quality is sufficient. If the absolute value of the difference is less than the threshold, encoding device 12 does not need to perform a second pass to re-encode, and instead simply transmits the segment of data (82).

If the absolute value of the difference between the weighted quality metric and the target quality metric exceeds the threshold, quality control module 24 adjusts at least one encoding parameter used for encoding the segment of data (84). For example, if the perceived quality metric is greater than the target quality metric by the threshold, quality control module 24 may increase a QP used for encoding. Likewise, if the perceived quality metric is less than the target quality metric by the threshold, quality control module 24 may decrease the QP used for encoding.

Encoding parameter adjustment module 56 determines whether the adjusted encoding parameter is within an acceptable range of parameters (86). Encoding parameter adjustment module 56 may compare the adjusted encoding parameter with the acceptable encoding parameter range associated with the segment of data, such as the QP ranges specified in TABLE 5. As described above, the acceptable encoding parameter range may differ based on the content class associated with the segment of data. If the adjusted encoding parameter is outside of the acceptable encoding parameter range, encoding parameter adjustment module 56 re-adjusts the encoding parameter to be within the acceptable encoding parameter range (87).

Quality control module 24 determines whether there is sufficient time to re-encode the segment of data (88). In one aspect, quality control module 24 may determine whether there is sufficient computer processing time left to re-encode the segment of data. In another aspect, quality control module 24 may determine the number of times the current segment of data has been re-encoded and not adjust the encoding parameters after the segment of data has been re-encoded more than a threshold number of times. In one example, the threshold number of times which the segment of data may be re-encoded is one.

If there is sufficient time to re-encode the segment of data, encoding module 18 performs a second pass to re-encode the segment of data using the adjusted encoding parameters, e.g., the adjusted QP (89). The second pass of encoding effectively refines the perceived quality metric towards the desired target quality metric, and may re-establish the content class of the video sequence. In some aspects, encoding module 24 may perform more than two encoding passes in an attempt to refine the observed quality. After the second pass re-encode, encoding device 12 computes a perceived quality metric of the re-encoded segment of data (72). If there is not sufficient time to re-encode the segment of data, encoding device 12 does not need to perform a second pass to re-encode, and instead simply transmits the segment of data (82).

Figure 7:
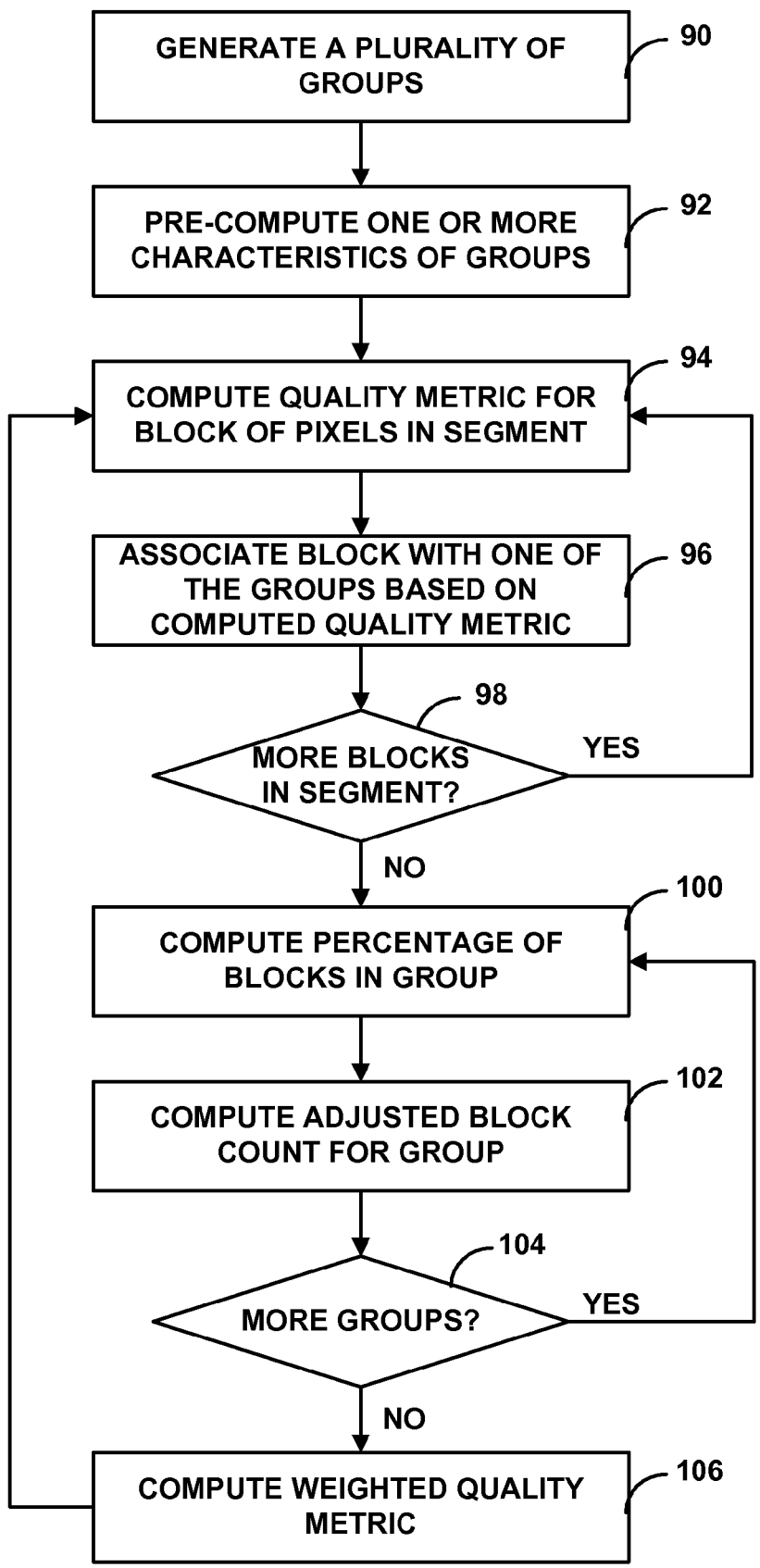
FIG. 7 is a flow diagram illustrating exemplary operation of a quality measurement module computing a weighted quality metric.

FIG. 7 is a flow diagram illustrating exemplary operation of quality measurement module 42 computing a weighted quality metric in accordance with the techniques of certain aspects of this disclosure. As described in detail above, the weighted quality metric may provide an objective video quality metric that more closely resembles the subjective quality as perceived by a viewer than conventional quality metrics.

Quality measurement module 42 generates a plurality of groups (90). As described in detail above, the groups may correspond to one or more difference metrics, such as SPPs, SADs, SSDs SATDs, SSTDs or the like. In one example, quality measurement module 42 may generate sixty-four groups that each correspond to four difference metrics. Quality measurement module 42 pre-computes one or more characteristics associated with each of the groups (92). Quality measurement module may pre-compute a quality metric, e.g., a PSNR value, associated with each of the groups. For instance, quality measurement module 42 may pre-compute the quality metrics by averaging the PSNR values associated with each of the difference metrics belonging to the groups. Additionally, quality measurement module 42 may pre-compute a weight associated with each of the groups. For example, quality measurement module 42 may pre-compute the weights using a logarithmic weight function that assigns higher weights to the groups which have higher difference metrics, e.g., higher SPP values.

Quality measurement module 42 computes a difference metric for a block of pixels of the segment of data (94). Quality measurement module 42 computes the same difference metric that was used to form the groups. For example, if the groups are generated based on SPP values, quality measurement module 42 may compute SPP values for the block of pixels using equation 1 above. Quality measurement module 42 associates the block of pixels with one of the groups based on the computed difference metric (96). Quality measurement module 42 may compare the quality metric of the block of pixels with the quality metrics of the groups, and associate the block of pixels with the group that corresponds with the same quality metric value. Quality measurement module 42 determines whether there are any other blocks of pixels in the segment of data (98). Quality measurement module 42 continues to associate each of the blocks of pixels with a group until all the blocks of pixels have been grouped. In this manner, quality measurement module 42 separates the blocks of pixels of the segment of data into one of the groups based on the quality metrics associated with the blocks of pixels.

When quality measurement module 42 has associated all of the blocks of pixels of the segment of data with one of the groups, quality measurement module 42 computes a percentage of blocks of pixels that are included in one of the groups (100). Quality measurement module 42 may compute the percentage by dividing the number of blocks of pixels associated with the group by the total number of blocks of pixels of the segment of data. In certain aspects, quality measurement module 42 may compute the percentages without including skip blocks of pixels. Quality measurement module 42 computes an adjusted block count for the group by multiplying the percentage of blocks of pixels in the group by the pre-computed weight associated with the group (102). Quality measurement module 42 determines whether there are any more groups (104), and computes percentage of blocks of pixels and adjusted block counts for each of the groups.

After computing the adjust block count for each of the groups, quality measurement module 42 computes the weighted quality metric for the segment of data (106). For example, quality measurement module 42 may compute the weighted quality metric for the segment of data based on the adjusted block counts and the quality metrics associated with the groups. In one example, quality measurement module computes the weighted quality metric according to the equation:

$$Wt\_Q = \Sigma(\text{Adjusted\_block\_cnt}[i] * \text{Group\_}Q[i])/\text{Total}MB\text{Cnt}, \quad (9)$$

where Wt_Q is the weighted quality metric, i=0, 1, ..., n, n is equal to the number of pixels in each of the frames associated with the segment of data, Adjusted block_cnt[i] is the adjusted block count associated with the $i^{th}$ group, Group_Q [i] is the quality metric associated with the $i^{th}$ group, and TotalMBCnt is a total number of blocks of pixels in the segment of data. By computing a quality metric for the segment of data in the manner described above, an objective video quality metric can be defined that is closer to the subjective quality experienced by a viewer relative to conventional techniques.

Figure 8:
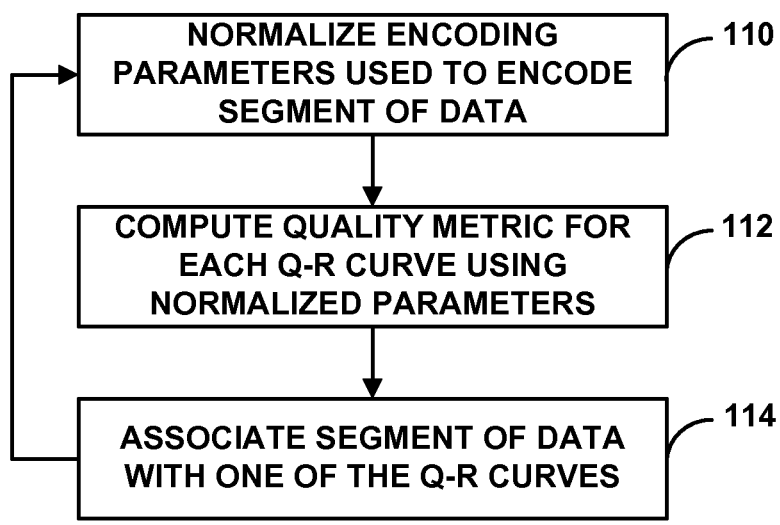
FIG. 8 is a flow diagram illustrating exemplary operation of a content classification module associating a segment of data with one of a plurality of content classes.

FIG. 8 is a flow diagram illustrating exemplary operation of content classification module 40 associating the segment of data with one of a plurality of content classes in accordance with the techniques of certain aspects of this disclosure. Initially, content classification module 40 normalizes one or more encoding parameters used to encode the segment of data to correspond with the parameters used to generate the content classes (110). For example, content classification module 40 may normalize a bitrate in accordance with equation (6) and the scaling factors included in TABLES 1 and 2.

Content classification module 40 computes a quality metric for each of the quality-rate curves using the normalized encoding parameters (112). For example, content classification module 40 may compute the quality metric for each of the quality-rate curves using the logarithmic function of equation (7) and the constants given in TABLE 3 along with a normalized bitrate.

Content classification module 40 associates the segment of data with one of the quality-rate curves (114). Content classification module 40 may associate the segment of data with one of the quality-rate curves based on the quality metrics of the quality-rate curves at the normalized bitrate and weighted quality metric of the encoded segment of data. In particular, content classification module 40 compares the quality metrics of the quality-rate curves computed at the normalized bitrate to the weighted quality metric and selects the quality-rate curve that corresponds to the quality metric that is closest to the weighted quality metric. In this manner, content classification module 40 associates the segment of data with the quality-rate curve that minimizes abs($Wt\_Q - Q_i$), where $Wt\_Q$ is the weighted quality metric and $Q_i$ is the quality metric associated with the $i^{th}$ class or curve.

Based on the teachings described herein, one skilled in the art should appreciate that an aspect disclosed herein may be implemented independently of any other aspects and that two or more of these aspects may be combined in various ways. The techniques described herein may be implemented in hardware, software, firmware, or any combination thereof. If implemented in hardware, the techniques may be realized using digital hardware, analog hardware or a combination thereof. If implemented in software, the techniques may be realized at least in part by a computer-program product that includes a computer readable medium on which one or more instructions or code is stored.

By way of example, and not limitation, such computer-readable media can comprise RAM, such as synchronous dynamic random access memory (SDRAM), read-only memory (ROM), non-volatile random access memory (NVRAM), ROM, electrically erasable programmable read-only memory (EEPROM), EEPROM, FLASH memory, CD-ROM or other optical disk storage, magnetic disk storage or other magnetic storage devices, or any other tangible medium that can be used to carry or store desired program code in the form of instructions or data structures and that can be accessed by a computer.

The instructions or code associated with a computer-readable medium of the computer program product may be executed by a computer, e.g., by one or more processors, such as one or more digital signal processors (DSPs), general purpose microprocessors, application specific integrated circuits (ASICs), field programmable logic arrays (FPGAs), or other equivalent integrated or discrete logic circuitry.

A number of aspects and examples have been described. However, various modifications to these examples are possible, and the principles presented herein may be applied to other aspects as well. These and other aspects are within the scope of the following claims.

What is claimed is:

1. A method for processing digital multimedia data, the method comprising:
   encoding a segment of data associated with the digital multimedia data using a set of encoding parameters;
   computing a perceived quality metric of the encoded segment of data;
   associating the encoded segment of data with one of a plurality of content classes, based at least on the computed perceived quality metric and at least one of the encoding parameters;
   adjusting at least one of the encoding parameters used to encode the segment of data based at least on the perceived quality metric of the encoded segment of data and a target quality metric, wherein the target quality metric corresponds to the associated content class; and
   re-encoding the segment of data using the adjusted encoding parameters.

2. The method of claim 1, wherein adjusting the at least one of the encoding parameters comprises adjusting at least one of the encoding parameters when a difference between the perceived quality metric and the target quality metric exceeds a threshold.

3. The method of claim 1, wherein adjusting the at least one of the encoding parameters comprises increasing a quantization parameter when the perceived quality metric is greater than the target quality metric by a threshold.

4. The method of claim 3, wherein increasing the quantization parameter comprises increasing the quantization parameter by an absolute value of a difference between the perceived quality metric and the target quality metric.

5. The method of claim 1, wherein adjusting the at least one of the encoding parameters comprises decreasing a quantization parameter when the perceived quality metric is less than the target quality metric by a threshold.

6. The method of claim 5, wherein decreasing the quantization parameter comprises decreasing the quantization parameter by an absolute value of a difference between the perceived quality metric and the target quality metric.

7. The method of claim 1, further comprising:
   comparing the adjusted at least one of the encoding parameters to a range for the at least one of the encoding parameters for the content class associated with the segment of data; and
   re-adjusting the at least one of the encoding parameters to be a value within the range for the at least one of the encoding parameters when the adjusted encoding parameter is outside the acceptable range for the at least one of the encoding parameters.

8. The method of claim 1, further comprising:
   identifying an initial target quality set point; and
   adjusting the initial target quality set point based on the content class associated with the segment of data to compute the target quality metric for the segment of data.

9. The method of claim 1, wherein encoding the segment of data comprises encoding the segment of data using a previous set of adjusted encoding parameters computed for a previous segment of data.

10. The method of claim 1, wherein associating the encoded segment of data with one of a plurality of content classes, based at least on the computed perceived quality metric and at least one of the encoding parameters comprises:

normalizing at least one of the one or more properties of the encoded segment of data to correspond with encoding parameters used to generate a plurality of quality-rate curves when the encoding parameters used to encode the segment of data are different than the encoding parameters used to generate the plurality of quality-rate curves, wherein the quality-rate curves each model a quality metric as a function of bitrate; and selecting one of the plurality of quality-rate curves based on the perceived quality metric and one of the at least one of the encoding parameters used to encode the segment of data, the at least one normalized property, and a resultant bitrate of the encoded segment of data.

11. The method of claim 10, wherein selecting one of the plurality of quality-rate curves comprises:

computing, for each of the plurality of quality-rate curves, a difference between the perceived quality metric and a quality metric on the respective quality-rate curve corresponding to the at least one normalized property; and selecting the one of the quality-rate curves that corresponds to a smallest difference of the computed differences.

12. The method of claim 1, wherein computing the perceived quality metric further comprises:

separating blocks of pixels of frames of data associated with the segment into groups based on at least one difference metric associated with each of the blocks of pixels;

associating quality metric values and weight values with each of the groups of blocks of pixels; and computing a weighted quality metric for the segment of data based on the quality metric values and weight values associated with of the groups.

13. The method of claim 12, wherein separating blocks of pixels into groups based on at least one difference metric comprises separating blocks of pixels into groups based on at least one of a sum of absolute difference (SAD), SAD per pixel (SPP), sum of squared differences (SSD), sum of absolute transformed difference (SATD), and sum of squared transformed difference (SSTD).

14. The method of claim 1, wherein associating the encoded segment of data with one of a plurality of content classes, based at least on the computed perceived quality metric and at least one of the encoding parameters comprises analyzing the one or more properties of the encoded segment of data to associate the segment of data with a certain one of a plurality of quality-rate curves.

15. An apparatus for processing digital multimedia data, the apparatus comprising:

one or more computing devices, the one or more computing devices comprising:

an encoding module that encodes a segment of data associated with the digital multimedia data using a set of encoding parameters;

a quality measurement module that computes a perceived quality metric of the encoded segment of data;

a content classification module that associates the encoded segment of data with one of a plurality of content classes, based at least on the computed perceived quality metric and at least one of the encoding parameters; and a quality control module that adjusts at least one of the encoding parameters used to encode the segment of data based at least on the perceived quality metric of the encoded segment of data and a target quality metric, wherein the target quality metric corresponds to the associated content class, wherein the encoding module re-encodes the segment of data using the adjusted encoding parameter.

16. The apparatus of claim 15, wherein the quality control module adjusts the at least one of the encoding parameters when a difference between the perceived quality metric and the target quality metric exceeds a threshold.

17. The apparatus of claim 15, wherein the quality control module increases a quantization parameter when the perceived quality metric is greater than the target quality metric by a threshold.

18. The apparatus of claim 17, wherein the quality control module increases the quantization parameter by an absolute value of a difference between the perceived quality metric and the target quality metric.

19. The apparatus of claim 15, wherein the quality control module decreases a quantization parameter when the perceived quality metric is less than the target quality metric by a threshold.

20. The apparatus of claim 19, wherein the quality control module decreases the quantization parameter by an absolute value of a difference between the perceived quality metric and the target quality metric.

21. The apparatus of claim 15, wherein the quality control module:

compares the adjusted at least one of the encoding parameters to a range for the at least one of the encoding parameters for the content class associated with the segment of data; and re-adjusts the at least one of the encoding parameters to a value within the range for the at least one of the encoding parameters when the adjusted encoding parameter is outside the acceptable range for the at least one of the encoding parameters.

22. The apparatus of claim 15, wherein the quality control module:

identifies an initial target quality set point; and adjusts the initial target quality set point based on the content class associated with the segment of data to compute the target quality metric for the segment of data.

23. The apparatus of claim 15, wherein the encoding module encodes the segment of data using a previous set of adjusted encoding parameters computed for a previous segment of data.

24. The apparatus of claim 15, wherein the content classification module:

normalizes at least one of the one or more properties of the encoded segment of data to correspond with encoding parameters used to generate a plurality of quality-rate curves when the encoding parameters used to encode the segment of data are different than the encoding parameters used to generate the plurality of quality-rate curves, wherein the quality-rate curves each model a quality metric as a function of bitrate; and selects one of the plurality of quality-rate curves based on the perceived quality metric and one of the at least one of the encoding parameters used to encode the segment of data, the at least one normalized property, and a resultant bitrate of the encoded segment of data.

25. The apparatus of claim 24, wherein the content classification module:

computes, for each of the plurality of quality-rate curves, a difference between the perceived quality metric and a quality metric on the respective quality-rate curve corresponding to the at least one normalized property; and selects the one of the quality-rate curves that corresponds to a smallest difference of the computed differences.

26. The apparatus of claim 15, wherein the quality measurement module:
separates blocks of pixels of frames of data associated with the segment into groups based on at least one difference metric associated with each of the blocks of pixels;
associates quality metric values and weight values with each of the groups of blocks of pixels; and
computes a weighted quality metric for the segment of data based on the quality metric values and weight values associated with of the groups.

27. The apparatus of claim 26, wherein the quality measurement module separates the blocks of pixels into groups based on at least one of a sum of absolute difference (SAD), SAD per pixel (SPP), sum of squared differences (SSD), sum of absolute transformed difference (SATD), and sum of squared transformed difference (SSTD).

28. The apparatus of claim 15, wherein the content classification module analyzes the one or more properties of the encoded segment of data to associate the segment of data with a certain one of a plurality of quality-rate curves.

29. An apparatus for processing digital multimedia data, the apparatus comprising:
means for encoding a segment of data associated with the digital multimedia data using a set of encoding parameters;
means for computing the perceived quality metric of the encoded segment of data;
means for associating the encoded segment of data with one of a plurality of content classes, based at least on the computed perceived quality metric and at least one of the encoding parameters;
means for adjusting at least one of the encoding parameters used to encode the segment of data based at least on the perceived quality metric of the encoded segment of data and a target quality metric, wherein the target quality metric corresponds to the associated content class; and
means for re-encoding the segment of data using the adjusted encoding parameter.

30. The apparatus of claim 29, wherein the means for adjusting the at least one of the encoding parameters comprises means for adjusting at least one of the encoding parameters when a difference between the perceived quality metric and the target quality metric exceeds a threshold.

31. The apparatus of claim 29, wherein the means for adjusting the at least one of the encoding parameters comprises means for increasing a quantization parameter when the perceived quality metric is greater than the target quality metric by a threshold.

32. The apparatus of claim 31, wherein the means for increasing includes means for increasing the quantization parameter by an absolute value of a difference between the perceived quality metric and the target quality metric.

33. The apparatus of claim 29, wherein the means for adjusting the at least one of the encoding parameters comprises decreasing a quantization parameter when the perceived quality metric is less than the target quality metric by a threshold.

34. The apparatus of claim 33, wherein the means for decreasing includes means for decreasing the quantization parameter by an absolute value of a difference between the perceived quality metric and the target quality metric.

35. The apparatus of claim 29, further comprising:
means for comparing the adjusted at least one of the encoding parameters to a range for the at least one of the encoding parameters for the content class associated with the segment of data; and
means for re-adjusting the at least one of the encoding parameters to a value within the range for the at least one of the encoding parameters when the adjusted encoding parameter is outside the acceptable range for the at least one of the encoding parameters.

36. The apparatus of claim 29, further comprising:
means for identifying an initial target quality set point; and
means for adjusting the initial target quality set point based on the content class associated with the segment of data to compute the target quality metric for the segment of data.

37. The apparatus of claim 29, wherein the means for encoding the segment of data comprises means for encoding the segment of data using a previous set of adjusted encoding parameters computed for a previous segment of data.

38. The apparatus of claim 29, wherein the means for associating further comprises:
means for normalizing at least one of the encoding parameters used to encode the segment of data to correspond with encoding parameters used to generate a plurality of quality-rate curves when the encoding parameters used to encode the segment of data are different than the encoding parameters used to generate the plurality of quality-rate curves, wherein the quality-rate curves each model a quality metric as a function of bitrate; and
means for selecting one of the plurality of quality-rate curves based on the perceived quality metric and one of at least one of the encoding parameters used to encode the segment of data, the normalized encoding parameters, and a resultant bitrate of the encoded segment of data.

39. The apparatus of claim 38, wherein the selecting means computes, for each of the plurality of quality-rate curves, a difference between the perceived quality metric and a quality metric on the respective quality-rate curve corresponding to the normalized encoding parameter and selects the one of the quality-rate curves that corresponds to the smallest difference.

40. The apparatus of claim 29, wherein the means for computing separates blocks of pixels of frames of data associated with the segment into groups based on at least one difference metric associated with each of the blocks of pixels, associates quality metric values and weight values with each of the groups of blocks of pixels, and computes a weighted quality metric for the segment of data based on the quality metric values and weight values associated with of the groups.

41. The apparatus of claim 40, wherein the means for computing separates blocks of pixels into groups based on at least one of a sum of absolute difference (SAD), SAD per pixel (SPP), sum of squared differences (SSD), sum of absolute transformed difference (SATD), and sum of squared transformed difference (SSTD).

42. The apparatus of claim 29, wherein the means for associating analyzes content of the encoded segment of data to associate the segment of data with one of a plurality of quality-rate curves.

43. A non-transitory machine readable medium having instructions stored thereon, the stored instructions including one or more segments of code, and being executable on one or more machines, the one or more segments of code comprising:
code for encoding a segment of data associated with the digital multimedia data using a set of encoding parameters;

code for computing the perceived quality metric of the encoded segment of data;

code for associating the encoded segment of data with one of a plurality of content classes, based at least on the computed perceived quality metric and at least one of the encoding parameters;

code for adjusting at least one of the encoding parameters used to encode the segment of data based at least on the perceived quality metric of the encoded segment of data and a target quality metric, which corresponds to the associated content class; and code for re-encoding the segment of data using the adjusted encoding parameter.

44. The non-transitory machine readable medium of claim 43, wherein the code for adjusting the at least one encoding parameter comprises code for adjusting at least one of the encoding parameters when a difference between the perceived quality metric and the target quality metric exceeds a threshold.

45. The non-transitory machine readable medium of claim 43, wherein the code for adjusting the at least one of the encoding parameters comprises code for increasing a quantization parameter when the perceived quality metric is greater than the target quality metric by a threshold.

46. The non-transitory machine readable medium of claim 45, wherein the code for increasing the quantization parameter comprises code for increasing the quantization parameter by an absolute value of a difference between the perceived quality metric and the target quality metric.

47. The non-transitory machine readable medium of claim 43, wherein the code for adjusting the at least one of the encoding parameters comprises code for decreasing a quantization parameter when the perceived quality metric is less than the target quality metric by a threshold.

48. The non-transitory machine readable medium of claim 47, wherein the code for decreasing the quantization parameter comprises code for decreasing the quantization parameter by an absolute value of a difference between the perceived quality metric and the target quality metric.

49. The non-transitory machine readable medium of claim 43, further comprising:
code for comparing the adjusted at least one of the encoding parameters to a range for the at least one of the encoding parameters for the content class associated with the segment of data; and
code for re-adjusting the at least one of the encoding parameters to a value within the range for the at least one of the encoding parameters when the adjusted encoding parameter is outside the acceptable range for the at least one of the encoding parameters.

50. The non-transitory machine readable medium of claim 43, further comprising:
code for identifying an initial target quality set point; and
code for adjusting the initial target quality set point based on the content class associated with the segment of data to compute the target quality metric for the segment of data.

51. The non-transitory machine readable medium of claim 43, wherein the code for encoding the segment of data comprises code for encoding the segment of data using a previous set of adjusted encoding parameters computed for a previous segment of data.

52. The non-transitory machine readable medium of claim 43, wherein the code for associating the encoded segment of data comprises:
code for normalizing at least one of the one or more properties of the encoding parameters used to encode the segment of data to correspond with encoding parameters used to generate a plurality of quality-rate curves when the encoding parameters used to encode the segment of data are different than the encoding parameters used to generate the plurality of quality-rate curves, wherein the quality-rate curves each model a quality metric as a function of bitrate; and
code for selecting one of the plurality of quality-rate curves based on the perceived quality metric and one of the at least one of the encoding parameters used to encode the segment of data, the at least one normalized property, and a resultant bitrate of the encoded segment of data.

53. The non-transitory machine readable medium of claim 52, wherein the code for selecting one of the plurality of quality-rate curves comprises:
code for computing, for each of the plurality of quality-rate curves, a difference between the perceived quality metric and a quality metric on the respective quality-rate curve corresponding to the at least one normalized property; and
code for selecting the one of the quality-rate curves that corresponds to a smallest difference of the computed differences.

54. The non-transitory machine readable medium of claim 43, wherein the code for computing the perceived quality metric further comprises:
code for separating blocks of pixels of frames of data associated with the segment into groups based on at least one difference metric associated with each of the blocks of pixels;
code for associating quality metric values and weight values with each of the groups of blocks of pixels; and
code for computing a weighted quality metric for the segment of data based on the quality metric values and weight values associated with of the groups.

55. The non-transitory machine readable medium of claim 54, wherein the code for separating blocks of pixels into groups based on at least one difference metric comprises code for separating blocks of pixels into groups based on at least one of a sum of absolute difference (SAD), SAD per pixel (SPP), sum of squared differences (SSD), sum of absolute transformed difference (SATD), and sum of squared transformed difference (SSTD).

56. The non-transitory machine readable medium of claim 43, wherein the code for associating the encoded segment of data comprises code for analyzing the one or more properties of the encoded segment of data to associate the segment of data with one of a plurality of quality-rate curves.

57. The method of claim 1, wherein associating the encoded segment of data with one of a plurality of content classes includes associating the encoded segment of data with one of a plurality of content classes based on a quantization parameter.

58. The apparatus of claim 15, wherein the content classification module that associates the encoded segment of data with one of a plurality of content classes associates the encoded segment of data with one of a plurality of content classes based on a quantization parameter.

59. The apparatus of claim 29, wherein means for associating the encoded segment of data with one of a plurality of content classes includes means for associating the encoded segment of data with one of a plurality of content classes based on a quantization parameter.

60. The non-transitory machine readable medium of claim 43, wherein code for associating the encoded segment of data with one of a plurality of content classes includes code for associating the encoded segment of data with one of a plurality of content classes based on a quantization parameter.

61. The method of claim 1, wherein adjusting at least one of the encoding parameters includes adjusting at least one of frame rate, encoding modes, deblocking, coefficient trimming, and motion vector refinement.

62. The apparatus of claim 15, wherein the quality control module that adjusts at least one of the encoding parameters is configured to adjust at least one of frame rate, encoding modes, deblocking, coefficient trimming, and motion vector refinement.

63. The apparatus of claim 29, wherein the means for adjusting at least one of the encoding parameters includes means for adjusting at least one of frame rate, encoding modes, deblocking, coefficient trimming, and motion vector refinement.

64. The non-transitory machine readable medium of claim 43, wherein the code for adjusting at least one of the encoding parameters includes code for adjusting at least one of frame rate, encoding modes, deblocking, coefficient trimming, and motion vector refinement.

\* \* \* \* \*